US005081564A

United States Patent [19]

Mizoguchi et al.

[11] Patent Number: 5,081,564

[45] Date of Patent: Jan. 14, 1992

[54] VEHICULAR LIGHTING DEVICE

[75] Inventors: Nobuyuki Mizoguchi; Takasumi Aoki; Nobol Ohisi, all of Shizuoka, Japan

[73] Assignee: Koito Manufacturing Co., Ltd., Tokyo, Japan

[21] Appl. No.: 549,993

[22] Filed: Jul. 9, 1990

[30] Foreign Application Priority Data

Jul. 11, 1989 [JP] Japan .............................. 1-80826[U]
May 18, 1990 [JP] Japan .............................. 2-51765[U]

[51] Int. Cl.5 .............................................. B60Q 1/00

[52] U.S. Cl. ...................................... 362/61; 362/331; 362/268; 362/335; 362/80

[58] Field of Search .................... 362/61, 80, 331, 332, 362/333, 334, 335, 308, 309, 336, 337, 268, 338, 339, 340

[56] References Cited

U.S. PATENT DOCUMENTS

| | | | |
|---|---|---|---|
| 3,435,293 | 3/1969 | Reading | 362/337 |
| 4,371,916 | 2/1983 | De Martino | 362/331 |
| 4,556,928 | 12/1985 | Tysoe | 362/268 |
| 4,557,260 | 3/1986 | Tysoe | 362/268 |
| 4,583,151 | 4/1986 | Nagel | 362/331 |
| 4,811,174 | 3/1989 | Kanzler et al. | 362/335 |
| 4,849,861 | 7/1989 | Arima | 362/80 |
| 4,912,606 | 3/1990 | Yamamoto | 362/80 |

FOREIGN PATENT DOCUMENTS

| | | | |
|---|---|---|---|
| 540799 | 9/1955 | Belgium | 362/268 |

*Primary Examiner*—Stephen F. Husar
*Assistant Examiner*—D. M. Cox
*Attorney, Agent, or Firm*—Sughrue, Mion, Zinn Macpeak & Seas

[57] ABSTRACT

A vehicular lighting device has a vertical-diffusion type reflecting surface, a bulb cap enclosing a bulb is formed with vertically extending steps thereon for light diffusion, and an outer lens formed with horizontally extending light diffusion steps thereon. The vehicular lighting device may be provided wih a colored inner lens in the shape of globe which covers the lamp bulb in sealed relation, and an outer lens provided at the outer surface side of the colored inner lens. The colored inner lens is formed with a lens-cut on the side surface thereof to direct light toward the side rear of the vehicle.

10 Claims, 5 Drawing Sheets

FIG. 1
PRIOR ART
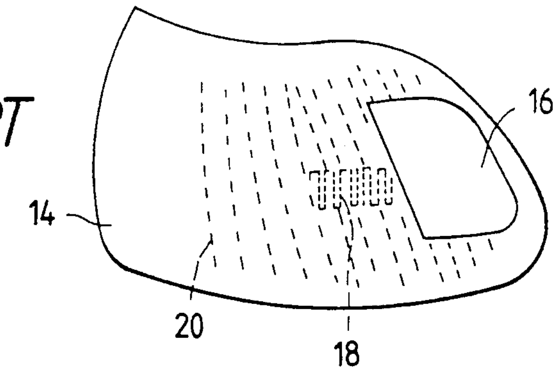
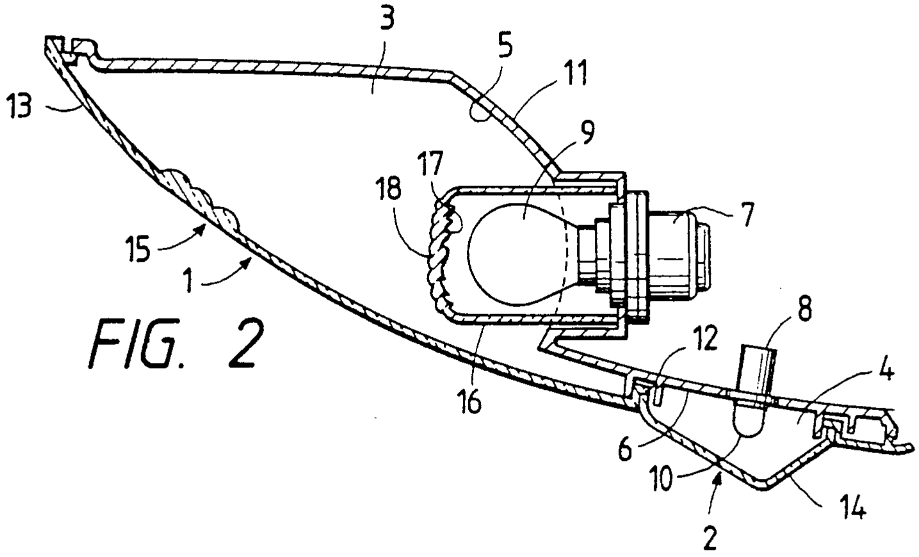
FIG. 2
FIG. 3
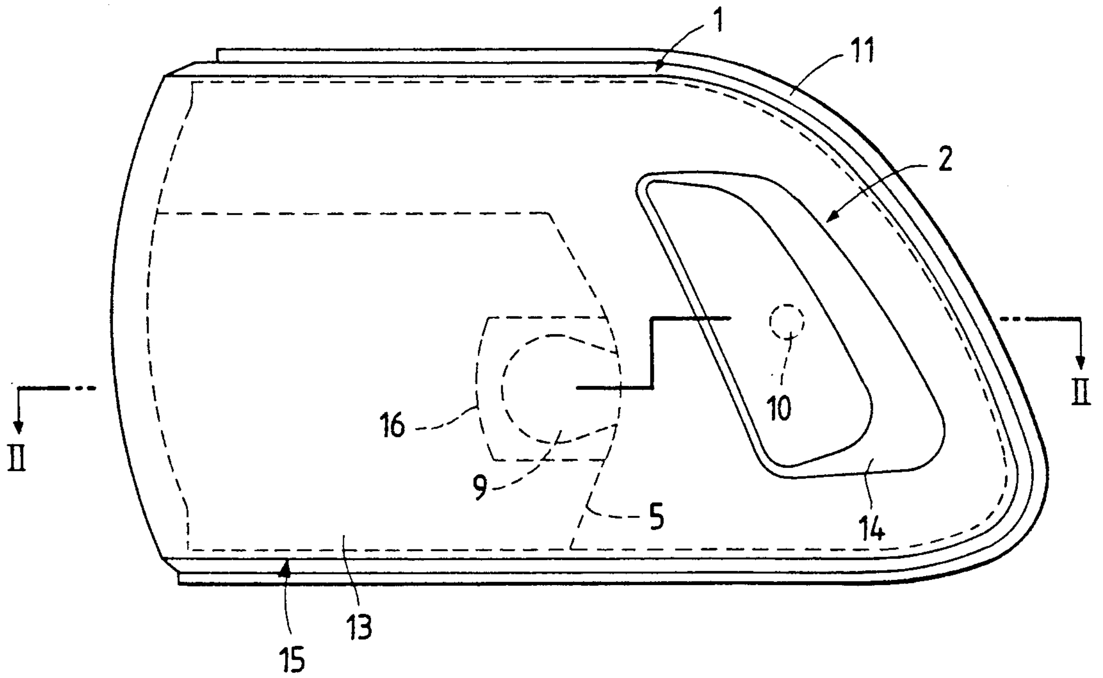

VEHICULAR LIGHTING DEVICE

BACKGROUND OF THE INVENTION

The present invention relates to a vehicular lighting device, and more particularly to a vehicular lighting device in which desired light distribution characteristics are obtained.

Conventionally, in vehicular lighting devices various configurations and combinations of reflector surfaces and steps formed on the surface of lenses have been employed in order to obtain desired light distribution characteristics.

In some lighting devices, light emitted from a bulb is diffused vertically upward and downward by a reflecting surface, and then horizontally leftward and rightward by a lens. Others are constructed such that the light is diffused horizontally leftward and rightwardly the reflecting surface and then vertically downward and upward by the lens.

In recent years, as automobiles have been designed with lower heights, there has been a tendency and requirement to reduce the vertical dimensions of vehicular lights and to provide them with a thin and compact construction as a whole. This of course requires that the lenses and reflectors also be reduced in their vertical dimensions. Doing so, however, has often resulted in insufficient vertical light diffusion, which in turn results in an undesirable vertically flat light distribution pattern. Accordingly, desired light distribution characteristics cannot be obtained.

Also, a variety of lighting devices have been proposed which are constructed such that the lighting of, for example, front turn signals can be observed from the side-and-rear position of the vehicle. This construction is intended to meet the legal requirements in the United States for the front turn signal lamps to be observable from the side rear of the vehicle at an angle of 45 degrees relative to the longitudinal direction of the vehicle.

FIG. 1 shows another conventional lighting device in which a lens-cut 18 composed of a plurality of elongated projections and recesses is formed on an outer lens 14 in such a manner that the light from the light source is directed not only toward the front of the vehicle but also toward the side rear of the vehicle. As an alternative to the lens-cut 18, a second inner lens (not shown) can be provided between the Outer lens 14 and a globe-like colored inner lens. The second inner lens is formed with a lens-cut thereon for directing the light toward the side rear of the vehicle.

However, the lighting device in which the outer lens 14 is formed with the lens-cut 18 thereon suffered from the problem that the lens-cut 18 can be clearly observed from the outside. That is, the lens-cut 18 does not visually merge well with a step pattern 20, resulting in a poor aesthetic appearance. On the other hand, the lighting device in which the second inner lens is formed with a lens-cut thereon has a higher cost due to the addition of the second inner lens.

SUMMARY OF THE INVENTION

The present invention was made to overcome the aforementioned drawbacks.

Accordingly, a primary object of the invention is to provide a vehicular lighting device in which desired light distribution characteristics can be obtained.

Another object of the invention is to provide a vehicular lighting device of thin construction and which provides sufficient light distribution in the vertical direction.

Still another object of the invention is to provide a vehicular lighting device which has a good appearance and which is inexpensive to manufacture.

A vehicular lighting device according to the present invention has a vertical diffusing type reflector and a bulb cap which is disposed around a bulb. The bulb cap is formed with vertically extending diffusion steps for causing light diffusion. An outer lens is formed with horizontally extending light diffusion steps. The bulb cap is formed with a refracting prism on its inner surface and a plurality of cylindrical steps disposed vertically on its outer surface, each of the steps extending horizontally. According to the present invention, since the light is diffused vertically upward and downward by both the reflecting surface and the bulb cap while the light is diffused horizontally leftward and rightward by the outer lens, even though the lighting device has a thin structure, light distribution characteristics are obtained such that the light is sufficiently diffused vertically upward and downward.

Another construction for achieving the above objects of the invention is characterized in that the vehicular lighting device is provided with a colored inner lens in the shape of globe which covers the lamp bulb in sealed relation, and an outer lens is placed on the outer surface side of the colored inner lens. The colored inner lens is formed with a lens-cut on the side surface thereof for directing the light toward the side rear of the vehicle. The light is directed to the side rear of the vehicle by means of a lens-cut formed on the side surface of the colored inner lens in the shape of globe which covers the lamp bulb. This eliminates the necessity of providing the conventional second inner lens.

In addition, since the lens-cut on the colored inner lens is not visible from the outside of the lens, the appearance of the lighting device is not impaired.

BRIEF DESCRIPTION OF THE DRAWINGS

FIG. 1 is a perspective view showing the outer appearance of a conventional lighting device;

FIG. 2 is a transverse cross-sectional view taken along a line II—II in FIG. 3 which shows a first embodiment of the invention;

FIG. 3 is a left side view of the first embodiment;

DESCRIPTION OF THE PREFERRED EMBODIMENTS

The present invention will now be described with reference to the attached drawings.

FIGS. 2–6B show a first embodiment of the invention, in which the present invention is applied to a lighting device for an automobile. In these figures, a left front turn signal lamp is illustrated which is integral with a side turn signal lamp. FIG. 3 is a left side view of the lamp, and FIG. 2 is a transverse cross-sectional view taken along a line II—II in FIG. 3.

Figure 4:
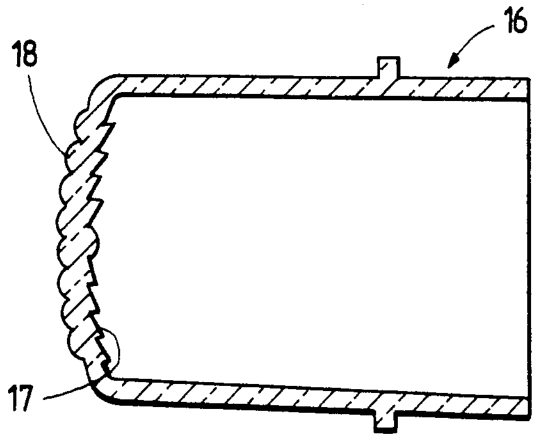
FIG. 4 is an expanded transverse cross-sectional view of a bulb cap.
Figure 5:
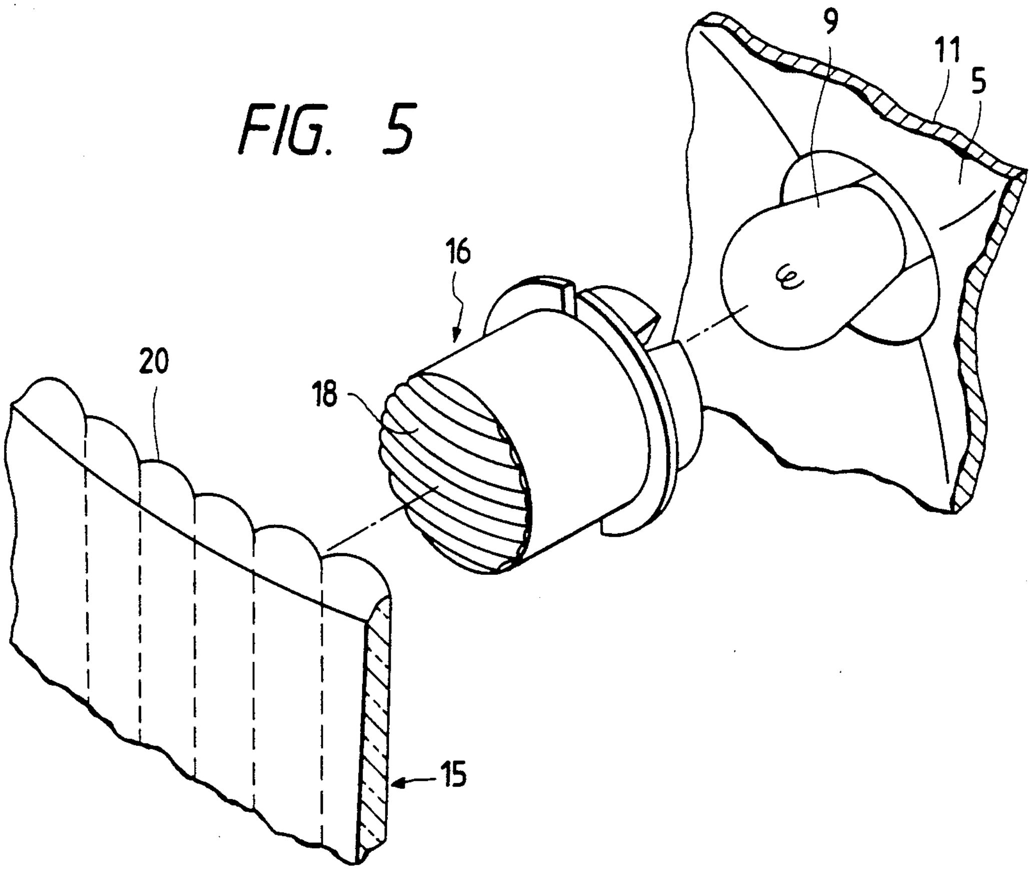
FIG. 5 is an exploded perspective view of essential parts of the lighting device of the first embodiment.

The front turn signal lamp 1 is disposed at the front side of the vehicle and the side turn signal lamp 2 on the side portion of the front turn signal lamp 1. Insulating material such as resin is molded to form a body 11. The body 11 is provided with a partition 12 which divides the space in the body 11 vertically into two parts, namely, a front turn signal o lamp chamber 3 and a side turn signal-lamp chamber 4. The lamp chambers 3 and 4 have reflecting surfaces 5 and 6, respectively, which are formed by depositing aluminum on the inner surface of the body 11. Bulbs 9 and 10 are supported in the respective chambers by means of sockets 7 and 8 inserted through holes extending into the respective chambers of the body 11. To the front opening of the body 11 is mounted an outer lens 15 which is formed integrally with a clear front turn signal lens 13 and an amber side turn signal lens 14. The outer lens 15 is attached at its periphery to the body 11. For the front turn signal lamp 1, an inner lens 16 substantially in the shape of a cylinder is disposed around the bulb 9 to enclose the bulb 9. The inner lens 16 is attached at its opening to the body 11. The inner lens 16, which is shown in more detail in the views of FIGS. 4 and 5, is molded of amber resin. The inner lens 16 is formed with Fresnel refracting prisms 17 on its inner surface, the prisms 17 converting the light from the bulb 9 into parallel rays. The inner lens 16 is formed with vertical diffusion steps 18 in the form of a plurality of laterally extending cylindrical steps, which are formed integrally with the inner lens 16 on the outer surface thereof.

The reflecting surface 5 has a parabolic cross section in the left and right directions and an expanded curved cross section in the vertical direction, thus providing a vertically diffusing surface by which the light from the bulb 9 is reflected such that light rays are parallel in the horizontal direction while being diffused upward and downward in the vertical direction.

The outer lens 15 has a plurality of diffusion steps 20 integrally continuous with the inner surface of the outer lens 15, the steps 20 being cylindrical steps which extend vertically. The steps 20 cause the light through the outer lens 15 to diffuse in the horizontal direction.

Figure 6A:
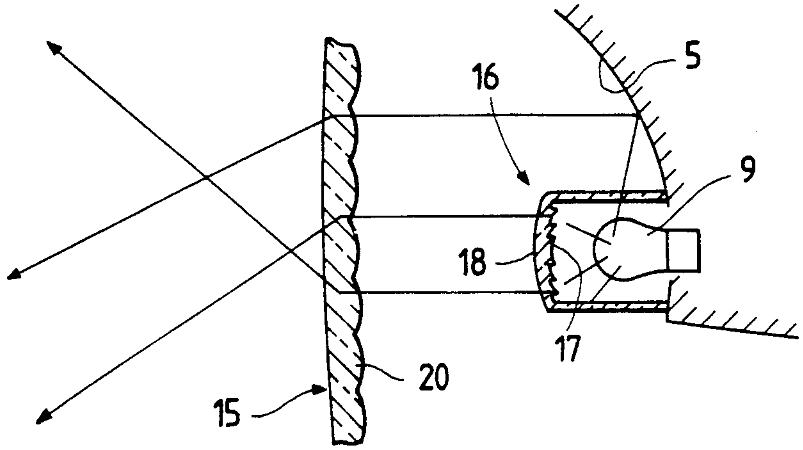
FIGS. 6A–6B illustrate the light diffused vertically upward and downward as well as horizontally leftward and rightward, respectively, with the lighting device of the first embodiment.
Figure 6B:
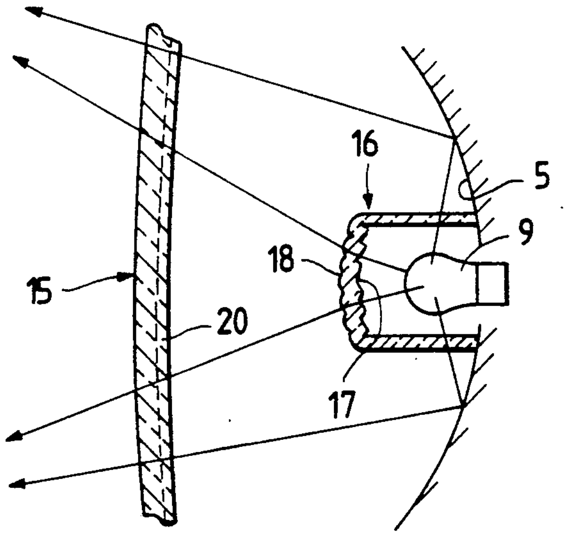

Being diffused in the horizontal direction as shown in o FIG. 6A and in the vertical direction as shown in FIG. 6B, the light from the bulb 9 is converted into parallel rays by the refractive prism 17, and then passes through the front surface of the inner lens 16. This arrangement eliminates the problem of a dark zone caused by the bulb mounting portion. The light passing through the front surface of the inner lens 16 is diffused in the vertical direction by an upward and downward diffusion steps 18 provided on the outer surface of the lens 16. When the light through the side portion of the inner lens 16 is reflected by the reflecting surface 5, the light is diffused vertically upward and downward since the reflecting surface 5 is a vertically diffusing surface. The light then passes through the outer lens 15 to be diffused in the leftward and rightward direction by the left and right diffusion steps 20 provided on the outer lens 15.

Therefore, with this lamp, the light is diffused sufficiently in the upward and downward directions by both the inner lens 16 and the reflecting surface 5 while also being diffused sufficiently in the leftward and rightward direction by the outer lens 15. This construction makes it possible to obtain the desired light distribution Characteristics in which the light is diffused both vertically upward and downward and horizontally leftward and rightward.

Figure 7:
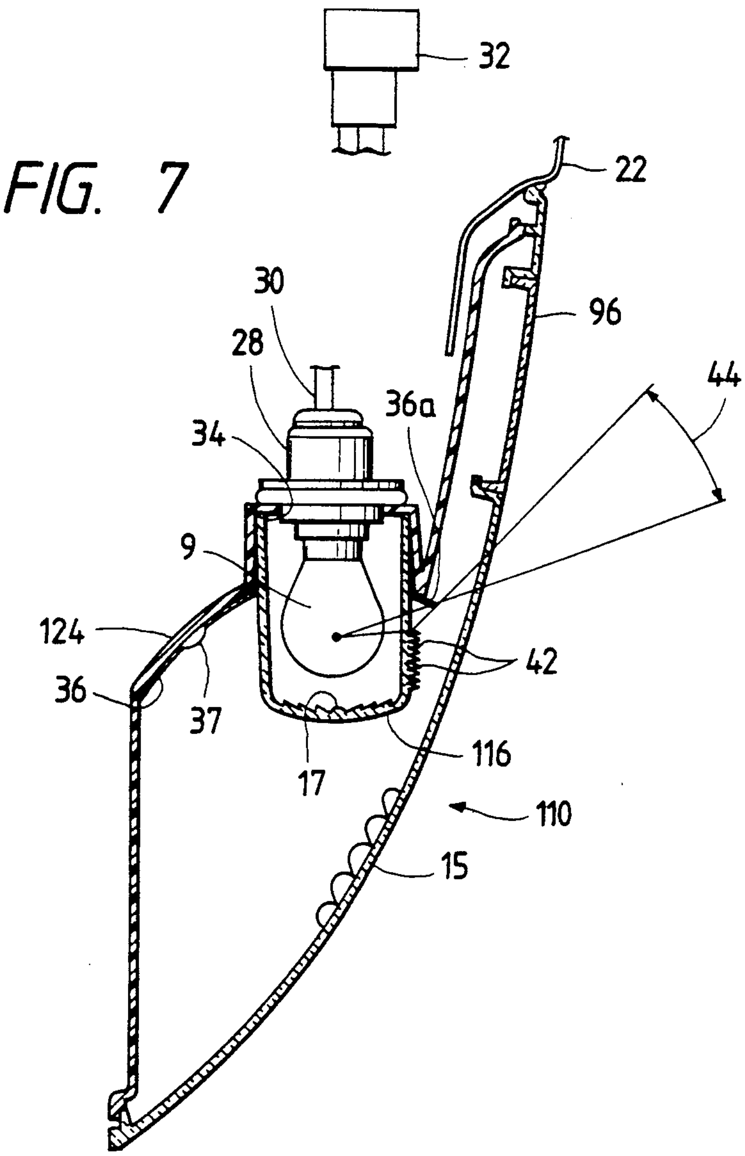
FIG. 7 is a horizontal cross-sectional view of a front turn signal lamp, which is a second embodiment of the invention.
Figure 8:
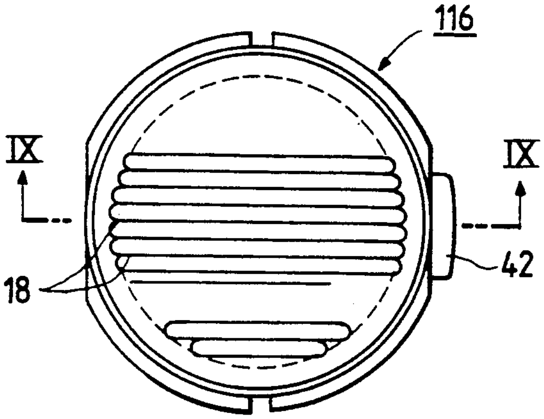
FIG. 8 is a front view of a colored inner lens enclosing the lamp bulb.
Figure 9:
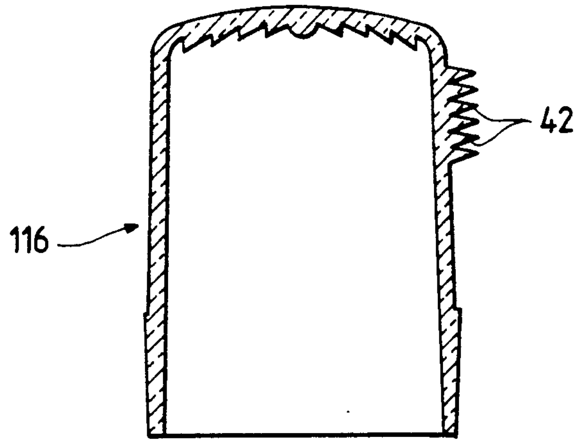
FIG. 9 is a horizontal cross-sectional view of the colored inner lens.

FIGS. 7–9 show a second embodiment of the invention. In the second embodiment, the present invention is applied to a lighting device which has a front turn signal lamp but has no side turn signal lamp.

FIG. 7 is a horizontal cross-sectional view of a left front turn signal lamp 110 adapted to be mounted on a corner portion of the vehicle.

The front turn signal lamp 110 according to the second embodiment is of substantially the same construction as that of the turn signal lamp according to the first embodiment, and thus like elements have been identified by like reference numerals, and only elements different from the first embodiment are described in detail below.

FIG. 8 is a front view of a colored inner lens enclosing the lamp bulb, and FIG. 9 is a horizontal cross-sectional view taken along the line IX—IX in FIG. 2.

The refractive prism and the upward and downward diffusion steps are omitted in FIG. 9.

The front turn signal lamp 110 is of unitary construction as a whole, and is mounted to a vehicle body 22. A lamp bulb 9 is inserted into a bulb insertion hole in the lamp body 124.

A reflector 36 which reflects amber light is securely mounted on the inner surface of the lamp body through heat sealing, as indicated at reference numeral 37.

Steps (not shown) are formed on the inner side of the outer lens 15, which is disposed outside the inner lens 116, to diffuse and guide the light in a predetermined direction toward the outside of the lighting device. A reflex reflector 96, formed integrally continuous with the outer lens 15, is provided at the rear of the outer lens 15 to reflect light from other vehicles.

As shown in FIG. 8, cylindrical steps 18 are formed on the front surface of the inner lens 116 to diffuse light, and a prism-like lens-cut 42 is formed on the side surface of the inner lens 116 to guide light toward the side rear portion of the vehicle.

If the prism-like lens-cut 42 were not provided, the light from the inner lens would not reach some parts at the side portion of the vehicle as shown at 44 in FIG. 7.

Further, in the second embodiment, to ensure sufficient observation of the lamp by other drivers at the front of the vehicle, the end portion 36*a* of the reflector 36 is formed to project toward the lens 15 from the inner surface of the lamp body. In other words, to ensure a sufficient amount of light at the front of the vehicle, the reflector 36 is formed larger than the inner surface of the lamp body 124, which further makes it difficult for the light to reach the rear portion of the vehicle. To eliminate the portion 44 to which no light would otherwise be directed, in the second embodiment a prism-like lens-cut 42 is formed on the side surface of the colored inner lens to direct more light toward the side rear portion of the vehicle, thus meeting the requirements for front turn signal lamps for vehicles sold in the United States.

According to the above-described second embodiment, forming the lens-cut 42 on the side surface of the colored inner lens 116 causes the lamp to direct sufficient light toward the side rear portion of the vehicle, as opposed to the prior art device which necessitates the provision of a second inner lens.

Further, no lens-cut is required on the outer lens 15 to distribute the light toward the side rear portion of the vehicle. This improves the appearance of the lighting device.

Although the lamp bulb 9 is enclosed by the globe-like colored inner lens 116, the lens-cut 42 formed on the side surface of the colored inner lens provides a large enough outer surface area for the colored inner lens to obtain sufficient heat radiation, thus eliminating the possibility of deformation o of and damages to the inner lens 116 due to the heat generated by the bulb.

While the second embodiment has been described with reference to a front turn signal lamp, the invention is equally applicable to a rear lamp.

Figure 10:
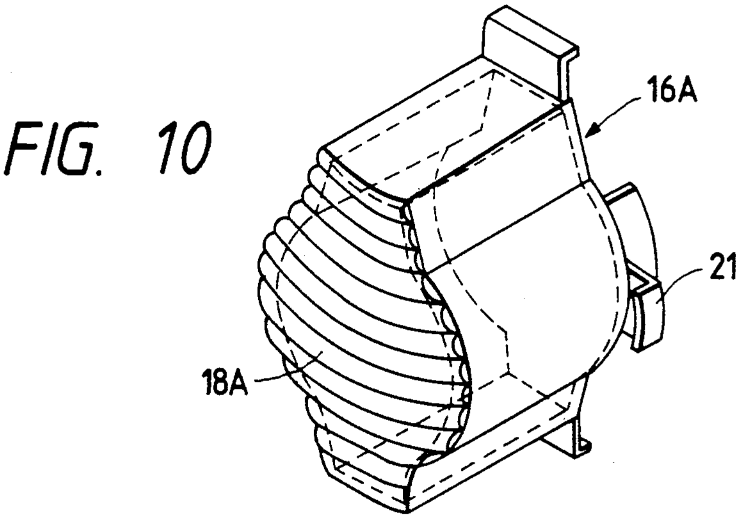
FIG. 10 is a perspective view of a modified bulb cap according to the invention.

FIG. 10 shows a modification of the inner lens according to the present invention. In this modification, the inner lens 16A has upward and downward trapezoidal extensions. On the tip inner surface of the inner lens 16A is formed a refractive prism (not shown). Cylindrical upward and downward diffusion steps 18A are formed on the outer front surface of the inner lens 16A. A mounting strap 21 is integrally continuous with the rear end of the inner lens 16A.

Extending the inner lens 16A vertically upward and downward ensures effective light diffusion in the vertical direction.

As described above, in accordance with the present invention, the reflecting surface of the lamp body has a vertically upward and downward reflecting construction, the bulb cap is provided with upward and downward diffusion steps, and the outer lens is provided with leftward and rightward diffusion steps. The light emitted from the bulb is diffused vertically upward and downward by both the reflecting surface and the bulb cap while also being diffused horizontally leftward and rightward by the outer lens. Thus, the present invention makes it possible for a lighting device of thin construction to provide desired light distribution characteristics in which the light is sufficiently diffused vertically upward and downward.

Further, according to the invention, the light can be directed toward the side rear area of the vehicle by forming the lens-cut on the side surface of the colored inner lens. This eliminates the necessity of providing a lens-cut on the outer lens to direct the light toward the side portion of the vehicle, which in turn improves the appearance of the lighting device without raising the cost of the lighting device.

What is claimed is:

1. A vehicular lighting device, comprising:

a lamp body having a diffusion reflecting surface reflecting light in upward and downward dictions;

a bulb supported by said lamp body;

a bulb cap enclosing said bulb, aid bulb cap having diffusion steps formed therein for diffusing light passing through said bulb cap in upward and downward directions; and an outer lens mounted over an opening of said body, said outer lens having diffusion steps formed therein for diffusing light received from said bulb cap and said reflecting surface in leftward and rightward directions.

2. The vehicular lighting device according to claim 1, wherein said bulb cap is formed with refractive prisms on an inner surface of an end portion thereof, an outer surface of said end portion being formed with upward and downward diffusion steps which include a plurality of cylindrical steps extending laterally and disposed parallel to each other.

3. The vehicular lighting device according to claim 2, wherein said bulb cap has a generally cylindrical shape.

4. The vehicular lighting device according to claim 2, wherein said bulb cap is formed of an amber-colored resin.

5. The vehicular lighting device according to claim 1, wherein said diffusion steps of said outer lens are cylindrical in configuration.

6. The vehicular lighting device of claim 1, wherein said reflecting surface has a parabolic cross section in a horizontal direction and an expanded curved cross section in a vertical direction.

7. The vehicular lighting device of claim 1, wherein said bulb cap has a generally cylindrical shape with trapezoidal upward and downward extensions.

8. The vehicular lighting device of claim 7, wherein said bulb cap has refractive prisms formed on an inner end surface thereof and cylindrical upward and downward diffusion steps formed on an outer front surface thereof.

9. The vehicular lighting device according to claim 2, wherein said refractive prisms are Fresnel refracting prisms.

10. A vehicular lighting device, comprising:

a lamp body having a diffusion reflecting surface reflecting light in upward and downward directions;

a bulb supported by said lamp body;

a bulb cap enclosing said bulb, said bulb cap having diffusion steps formed in an inner end surface thereof for diffusing light passing through said bulb cap in upward and downward directions and a lens-cut formed on a side surface portion thereof for directing light emitted from said lamp bulb toward a side portion of said vehicle; and an outer lens mounted over an opening of said body, said outer lens having diffusions steps formed therein for diffusing light received from said bulb cap and said reflecting surface in leftward and rightward directions.

* * * * *